United States Patent
Chambon et al.

(10) Patent No.: US 6,766,177 B2
(45) Date of Patent: Jul. 20, 2004

(54) MOBILE PHONE

(75) Inventors: François Chambon, Paris (FR); Jocelyn Leheup, Paris (FR)

(73) Assignee: Sagem SA, Paris (FR)

(*) Notice: Subject to any disclaimer, the term of this patent is extended or adjusted under 35 U.S.C. 154(b) by 551 days.

(21) Appl. No.: 09/808,393

(22) Filed: Mar. 14, 2001

(65) Prior Publication Data

US 2002/0016186 A1 Feb. 7, 2002

(30) Foreign Application Priority Data

Mar. 14, 2000 (FR) .............................. 00 03268

(51) Int. Cl.[7] .............................................. H04M 1/20
(52) U.S. Cl. .................... 455/550.1; 455/558
(58) Field of Search ........................ 455/550.1, 558, 455/575.1, 566, 573

(56) References Cited

U.S. PATENT DOCUMENTS

| | | | | |
|---|---|---|---|---|
| 5,036,461 A | | 7/1991 | Elliott et al. ................. | 364/408 |
| 5,887,266 A | | 3/1999 | Heinonen et al. ........... | 455/558 |
| 6,012,634 A | * | 1/2000 | Brogan et al. .............. | 235/380 |
| 6,178,324 B1 | * | 1/2001 | Choquet et al. ............ | 455/558 |
| 6,490,464 B1 | * | 12/2002 | Oda ........................... | 455/558 |

FOREIGN PATENT DOCUMENTS

| | | |
|---|---|---|
| DE | 19816575 | 1/1999 |
| EP | 0599244 | 6/1994 |
| EP | 0626664 | 11/1994 |
| EP | 0700194 | 3/1996 |

* cited by examiner

*Primary Examiner*—Nguyen T. Vo
*Assistant Examiner*—Alemayehu Behulu
(74) *Attorney, Agent, or Firm*—Patterson, Thuente, Skaar & Christensen, P.A.

(57) ABSTRACT

To resolve problems of communication between a mobile telephone provided with a smart-card reader and the circuits of a smart-card reader, it is planned to provide this mobile telephone with a fourth microprocessor designed to manage the communications of the mobile telephone with the smart card only. This fourth microprocessor then becomes, in competition with a SIM security circuit of the mobile telephone, a master of the microprocessor of the mobile telephone. To resolve the problem of competition resulting from the existence of these two master circuits, it is planned that one of the two will be called upon to execute a command and that it will execute this command if it falls within the commands that are executable by it. If this command is not executable by this first microprocessor, then it is transmitted to the microprocessor of the second master circuit so that this second master circuit executes it. By acting in this way, it is shown that it is very easy to update mobile telephones, even old models. To this end, it is enough to place especially the fourth microprocessor in a battery pack and interchange the battery pack with the original battery pack.

14 Claims, 2 Drawing Sheets

MOBILE PHONE

BACKGROUND OF THE INVENTION

1. Field of the Invention

An object of the present invention is an improved mobile telephone, namely a telephone capable of performing operations other than mobile telephony operations. In this respect, in the present invention, the term "mobile telephone" must be understood to mean actually a device that can use the resources of a mobile telephone to send messages that are not necessarily speech messages but may be data or other messages.

The mobile telephone of the invention is chiefly a mobile telephone capable of exchanging information with a base station and furthermore with a device other than a base station. This other element will be mainly, in the description, a chip carrier, especially a smart card. However, this other device could also be a microcomputer or the like. This microcomputer will be connected to the mobile telephone, especially by a connector at the base of the telephone casing, an infrared link or an RF link used for data exchanges between this microcomputer and the mobile telephone and, beyond the mobile telephone, between the microcomputer and a remote site, especially an Internet site. When the mobile telephone is linked to a smart card, this mobile telephone will comprise, especially in a battery pack, for example a removable battery pack, a smart-card reader in which a smart card (or a chip carrier) can be inserted.

2. Description of the Prior Art

Equipment of this kind currently shows several types of problems. The first problem generally relates to the requirements of an operator who puts smart cards into operation. An operator of this kind, for example a bank, will require that the readers into which these smart cards will be inserted for interaction with the operator's services should be authorized readers. To obtain this result, a system has also been devised where a chip token, contained in the mobile telephone and corresponding to a subscription of the user of the mobile telephone with a mobile telephony operator, has to be modified to incorporate this kind of a faculty of transaction with the services of the smart-card operator. In practice, it has been imagined that the chip token, known as a SIM (Secure Identification Module) circuit, has a faculty of conversation with the services of the smart-card operator to enable the mobile telephone to act as a reader (a physically separated and remote reader). An approach of this kind, however, has the drawback wherein the mobile telephony operator who implements the SIM circuit and the smart bank card operators have to reach agreement on the management protocol incorporated in a program memory of this chip token. This agreement is not easy to obtain especially because bank operators are mistrustful. Furthermore, this agreement has to be repeated for each different banking operator. In practice, such is the hesitation over the use of this kind of system that it is not really becoming established.

Another problem raised by this type of approach is that the smart-card reader constituted by the mobile telephone is of course capable of reading only one type of smart card. It should be capable of reading several of them. As the case may be, even for one and the same type of smart card, the reader should be capable of open-ended development, namely it should be capable of providing increasingly improved functions in taking account of the development of the smart cards themselves. The management of the chip tokens and the authorization that they contain then become almost inextricable. And this management is a second reason for the lack of success of the system.

The requirements laid down by the operators who manage smart cards are different from those laid down by the mobile telephony operators who are interested only in the duration of the calls. These requirements include especially the need to transmit a reader number as well as a type of reader or inserted smart card to enable the banking operator services to activate one type of operation or another according to a wish expressed by the user. To simplify matters it may be assumed, that depending on the type of reader, the mode of enciphering secret codes could be different, complicated in varying degrees, and increasingly difficult to break.

As opposed to a technical approach that appeared to be emerging, using a SIM circuit known as a TOOL KIT in which a kit of functions and authorizations makes it possible precisely to carry out transactions with the smart-card operators, the invention recommends the resolving of the problem differently. In the invention, another microprocessor is created in the telephone, preferably removable in the form of a microcard (preferably of the same size as the chip token), that gets linked up with the microprocessor of the mobile telephone, in competition with the SIM circuit of the token. According to the invention, the problem of competition to be resolved is dealt with by creating a preference of execution of commands by the SIM circuit (the chip token). Should the command to be executed be rejected by this SIM circuit (because this command does not correspond to it), then it is executed by the microprocessor that has been added as a supplement to the mobile telephone.

In brief, the mobile telephone gets linked up when the mobile telephone starts operating by putting the SIM circuit into operation. When a connection is made with the services of the smart-card operator (a bank), this bank sends a request. This request is transmitted, for example, by sending SIM (short message service) type class 2 messages 2. This request is intended for the mobile telephone. It is aimed at activating a given application therein. For example it obtains the communication, to the smart-card operator, of the number of the reader (in the mobile telephone) that gets connected with the application. This request is not part of the request that can be understood by the SIM circuit. This SIM circuit normally reroutes the messages that it does not understand towards a store of these messages in one of the memories of the mobile telephone.

In the invention, before this rerouting, the command is sent to the additional microprocessor in asking it if it is capable of interpreting and executing the command. Normally, it is capable of interpreting this command because this additional microprocessor has been precisely given for this purpose by the bank smart-card operator. This additional microprocessor then informs the microprocessor of the mobile telephone that it is capable of carrying out the command and the expected transaction takes place.

By acting in this way, the problem of exchanges between mobile telephony operators and smart-card operators is eminently resolved since they no longer need to agree on the operating protocols inside one and the same security circuit. Furthermore, the various operations that can be used with a smart card are essentially payment operations or what are known as electronic ticket operations, whether these are pure payment operations, operations for increasing credit or electronic wallet debit operations, operations instituted in common with the bank and certain service providers such as airlines or the like. In these conditions, the additional microprocessor will advantageously be removable, in the form of a microcard. This microcard will be associated with the smart card to form a pair with this card that it is supposed to read in a mobile telephone.

SUMMARY OF THE INVENTION

An object of the invention therefore is a mobile telephone comprising:
- a first microprocessor to carry out a physical management of telecommunications circuits of the mobile telephone,
- a second microprocessor to manage subscriber signals for the use of this mobile telephone on a mobile telephony network,
- a chip carrier reader to receive a chip carrier, this chip carrier being possibly provided with a third microprocessor, wherein the mobile telephone comprises:
- a fourth microprocessor to manage the communication between the smart card reader and the first microprocessor, and
- in a program memory of the first or second microprocessor, a program for the rerouting, to the fourth microprocessor, of the commands whose execution by the second microprocessor has been attempted therein without success.

BRIEF DESCRIPTION OF THE DRAWINGS

The invention will be understood more clearly from the following description and the appended figures. These figures are given purely by way of an indication and in no way restrict the scope of the invention. Of these figures.

MORE DETAILED DESCRIPTION

Figure 1:
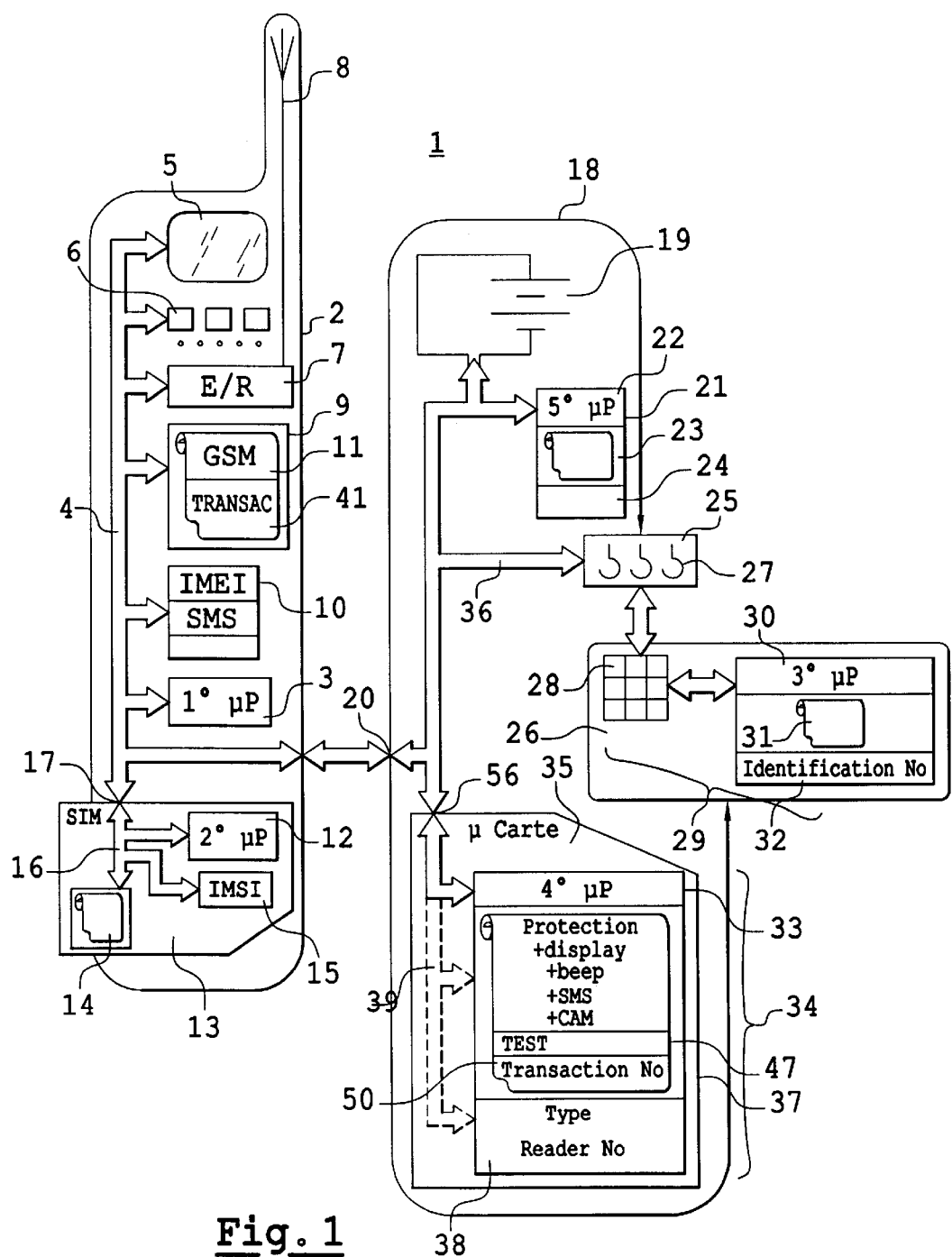
FIG. 1 is a diagrammatic view of the architecture of a mobile telephone according to the invention.

FIG. 1 shows a mobile telephone 1 according to the invention. This mobile telephone 1, in one example, comprises a mobile telephone pack 2 with the essential functions of the mobile telephone. This pack 2 thus essentially comprises a first microprocessor 3 connected by means of a data, control and address bus 4 to a display screen 5, a control keypad 6 of the mobile telephone and a transmission-reception device 7. The transmission-reception device 7 is furthermore linked to a radiating means 8 herein symbolized by an antenna. The first microprocessor 3 is capable of physically managing the telecommunications circuits of the mobile telephone, especially transmission-reception circuits 7. The first microprocessor 3 is also capable of processing the speech or data signals exchanged or of having them processed. To this end, it comprises a program memory 9 and a data memory 10. The program memory 9 comprises a program 11, herein called a GSM, to carry out the physical management of the telecommunications circuits of the mobile telephone 1. In practice, the program 11 manages the circuit 7 as well as other circuits (not shown), especially a speech signal processor and, in reception, a decoder, especially a Viterbi decoder. The data memory 10 comprises indicators on the mobile telephone, especially an identification number IMEI, information designed for use as well as small short service messages (SMS) that have been received.

The mobile telephone 1 also has a second microprocessor 12 designed to manage subscription signals enabling the use of the mobile telephone 1 with a mobile telephony network (not shown). To this end, the microprocessor 12 is contained in a chip carrier 13, commonly called a SIM, that is internally linked with a program memory 14 and a data memory 15 by means of an internal bus 16. In practice, the circuits 12, 14, 15 and 16 form a microcontroller integrated into one and the same integrated circuit which itself is inserted into the carrier 13. The second microprocessor 12 is linked with the microprocessor 3 by means of the bus 4 and an interface, namely a connector 17.

The telephone 1 also has a chip carrier reader 25, for reading especially a smart card 26. The reader 25 is herein symbolized by feelers 27 designed to come into contact with the metallizations 28 of the chip 29 of the chip carrier 26. The chip 29 especially comprises a third microprocessor 30 connected with a program memory 31 and a data memory 32 by an internal bus. The chip 29 also has the form of a microcontroller with the particular feature, however, wherein its program memory 31 is more easily programmable. The smart card 26 is made available to the user of the mobile telephone 1 by a smart-card operator, in practice a bank, and the smart card 26 can thus be a payment card, a remote payment card, an electronic wallet or again a card capable of implementing an electronic ticketing function through which a user, especially in the context of use for air travel, can make a reservation and store information in the memory 32 pertaining to traveling reservations made and air miles gained.

The invention is characterized chiefly by the presence of a fourth microprocessor 33 capable of managing communications between the chip carrier reader 25 and the first microprocessor 3 and, more generally, between this reader 25 and the circuits of a smart-card operator who can be contacted by means of the mobile telephone 1 and the mobile telephony network corresponding to the mobile telephony operator of the SIM circuit 13. In practice, the fourth microprocessor 33 is contained in a single integrated circuit 34 crimped into a microcard 35. The microcard 35 is preferably removable from a battery pack 18, herein in the same way as the SIM card 13 is removable from the pack 2 of the mobile telephone. Preferably, the microcard 35 is placed in a state of communication with an bus 36 that provides the interface of a microcontroller 21 with the bus 4. However, it is possible to imagine a case where the microcard 35 is inserted into the pack 2 and is directly linked with the bus 4. The microcard 35, especially if it has to perform many varied operations, may comprise several integrated circuits, especially a program memory 37 and a data memory 38. If the circuit 34 is thus formed by several circuits, each of them will be linked, by means of a bus 39, with the bus 36 and/or the bus 4.

The microcard 35 is capable of obtaining the implementation, by the mobile telephone 1, of the following elementary operations: display, keypad beeping, keying-in of SMS messages and sending of requests, especially requests for communications to the mobile telephony network. These functions are the same as those performed by the microprocessor 12 of the card 13. The dialogs between the microprocessors 3 and 33 may preferably be governed by the same protocol as those exchanged between the microprocessors 3 and 12. This protocol is known as the SIM TOOL KIT and complies with the GSM standard 11 14.

For its electrical supply, the mobile telephone 1 comprises a battery pack 18 provided with a battery 19. In this case, the battery pack 1 is removable. The battery 19 is connected by an interface 20 to the bus 4. The pack 18 comprises an interface circuit 21, generally a microcontroller, namely an integrated circuit comprising, on one and the same integrated circuit, a fifth microprocessor 22, a program memory 23 (generally non-programmable) and a data memory 24 (generally small). The fifth microprocessor 22 is located on an interface between the pack 2 of the mobile telephone and the battery pack 18. For reasons of convenience of construction, the fifth microprocessor 22 is placed in the battery pack 18. It is possible however to imagine a situation where it is placed in the pack 2. The microprocessor 22 manages the power supply, i.e. it is capable of informing the mobile telephone of the charged status of the battery 19 and, during the charging, it is capable of asking that the charging operation be stopped when the battery is completely charged.

Thus constituted, this microprocessor architecture leads to the availability of a slave microprocessor, the microprocessor 3 and two master microprocessors, the microprocessor 12 and the microprocessor 33. To prevent any conflict of operation that may result therefrom, it is planned that one of the master microprocessors which takes control informs the other one in one way or another of the fact that it has taken control of the bus, especially the bus 4.

With regard to the microprocessor 12, an operation of this kind complies with the GSM standard. Indeed, the microprocessor 12, after performing the operations of verification of subscription, and especially after having sent the mobile telephony operator an IMSI number incorporated in its memory 15, goes into standby and allows the microprocessor 3 to manage the bus 4. In the invention, when the microprocessor 33 has to act, it activates the microprocessor 3 by means of the bus 4 and it is not opposed by the microprocessor 12 which is on standby. When the microprocessor 12 is not on standby, the program memory of the microprocessor 33 sees to it that the latter cannot try and take control over the bus 4. This is achieved, for example, in the microprocessor 33 by a measurement and a test of the signals present on the bus 4.

Figure 2:
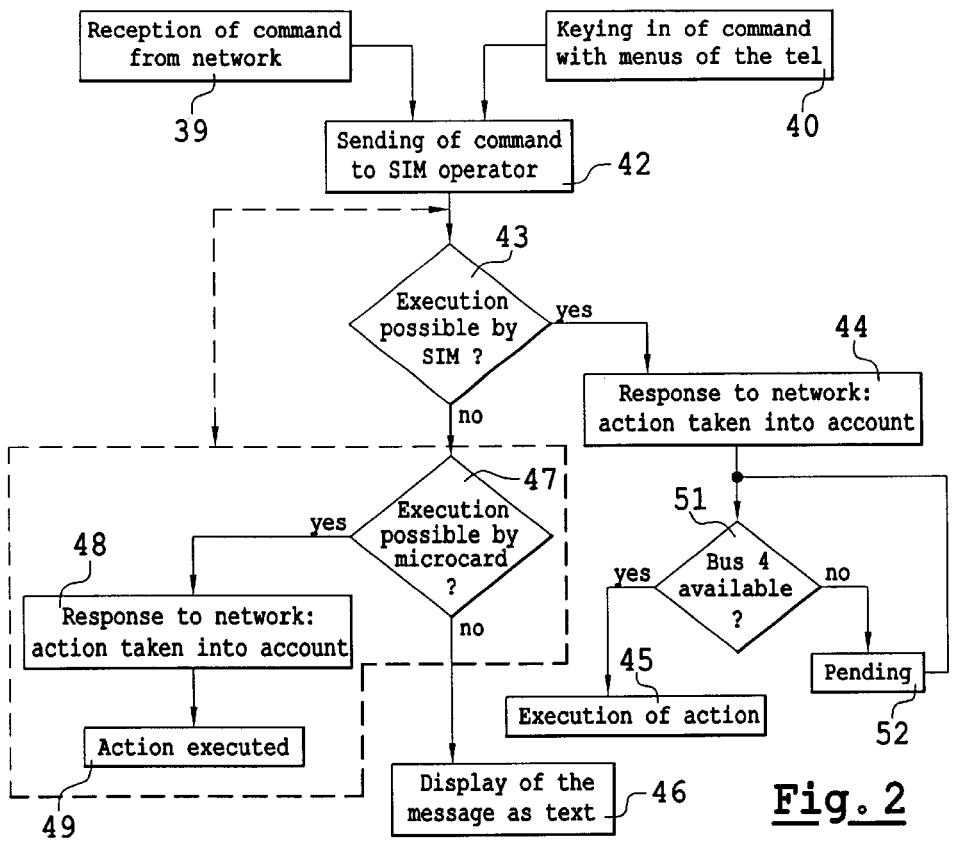
FIG. 2 shows essential steps of the method implemented in this architecture of microprocessors according to the invention.

FIG. 2 shows the reaction of this system of microprocessors when an external command occurs. The external command may come from the mobile telephony network during a reception operation 39 or may result from the keying in 40 of a command with the keys of the keyboard 6, in application of menus available in the program memory 9, especially a transaction memory 41. This menu 41 in practice generically receives a transaction program which, for its part, is contained in the memory program 37. The command thus available is sent to the microprocessor 12 in accordance with the GSM standard, during an operation 42. In a known way, the microprocessor 12 then, as a function of a program contained in a program memory 14, launches a test 43 to find out if it can execute the command that it has just received. When it can execute the command, it performs two operations. First of all, in a step 44, it responds to the network or to the screen 5 of the mobile telephone to say that the action has been taken into account and secondly executes the operation during a step 45.

If the command received by the SIM circuit 13 cannot be executed by this circuit, this command is considered to be a message to be displayed as a text during an operation 46. In the invention, it is then planned that the first microprocessor 3 or the second microprocessor 12 will transmit the command received to the fourth microprocessor 33. This microprocessor 33 then carries out a a test 47, of the same type as the test 43, to find out if this fourth microprocessor 33 is capable of executing the command received. If the command is intended for this fourth microprocessor 33, it can of course execute it and, in this case, the fourth microprocessor 33 preferably sends a response 48 to the network to report that the command has been received. The step 48 is followed by a step 49 during which said action is executed. Naturally, if the fourth microprocessor 33 is not capable of performing the command, it means that it is a message to be displayed or stored in one of the memories of the mobile telephone and this action is undertaken accordingly.

In a particular example, the received command comprises a command for the communication of a number and/or type of reader and/or smart card 26. This command therefore reaches the mobile telephone 1 through the antenna 8. It is normally applied to the SIM circuit 13 which, in the present case, does not recognize it, goes back into standby and informs the microprocessor 3 that the message received is in principle a text (for which no reception acknowledgment message has to be given) designed to be stored in one of the memories of the mobile telephone. The microprocessor 3 receiving this rejection information then sends the command to the fourth microprocessor 33 so that it executes the command. The received command then corresponds to a subprogram 50 contained in the program memory 37 and the fourth microprocessor 33 carries out a transmission of a reader number or a type of reader contained in the memory 38 of the microcard 35.

Thereafter, in the transaction, on a request coming from the smart card operator that follows one and the same path, the fourth microprocessor 33 can make the third microprocessor 30 pick up the identification number of the smart card 26 and transmit it also in return to the smart-card operator who has requested it. This operator may then make the fourth microprocessor 33 launch the conventionally known operations of secret code verification and payment validation. The mobile telephone 1 then acts here only to format the validated payment message, constituted in a format that can be transmitted by the mobile telephone, and to transmit it through the mobile telephony network to the concerned smart card operator. The preferred format is an SMS format. In this case, the processing with the two tests will be the rule. However, the smart-card operator may define a specific data transfer format. In the latter case, it is possible to avoid the systematic use of the second microprocessor 12 every time.

It is possible, while this transaction is being performed and lasts for a non-negligible duration of several seconds, that an SMS type message will be received by the mobile telephone because it is sent to it by another channel. In this case, this message can be executed by the SIM circuit 13 and may lead to a positive response of the test 43 at a time when the task performed by the fourth microprocessor 33 is not over. If furthermore an acknowledgment of reception of this message is not sent to the network, the network will have to repeat the transmission of the SMS message until it is received. Thus, to prevent overloading the network although the SMS command has been correctly received the first time, it is planned, before the execution 45 of this command by the second microprocessor 12 (implying the management of the bus 4) to send, in a step 44, an acknowledgment to the network and take account of the unavailability of the bus 4. To this end, during a test 51, the availability of the bus 4 is measured. If the bus 4 has to be managed by the fourth microprocessor 33 (executing for example a payment procedure), the first microprocessor 3 places the SMS message in a stored standby state during a step 52 and periodically launches the execution of the test 51 until the bus 4 is released. The availability loop 5152 may preferably be implemented by the microprocessor 3. It can furthermore be executed in the opposite context, to defer the execution 49 of a command coming from the smart-card operator while the second microprocessor 12 is processing an SMS message received by the SMS channel.

Figure 3:
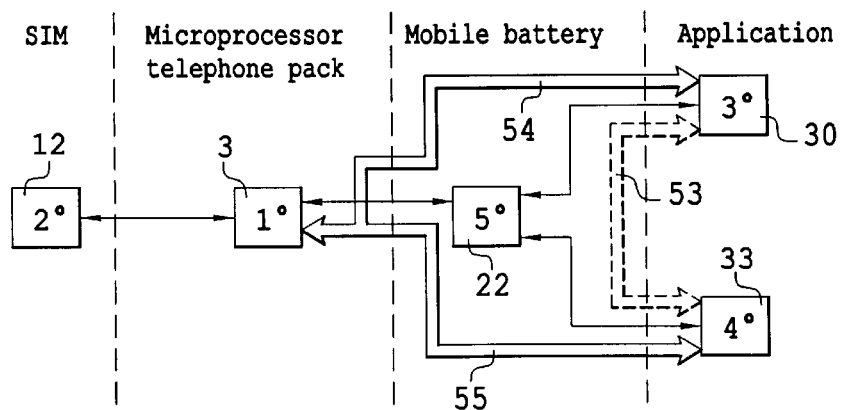
FIG. 3 is a diagrammatic view of the circulation of data in this microprocessor architecture in a particular type of use.

FIG. 3 shows a preferred mode of placing the fourth microprocessor 33 into a state of connection with the third microprocessor 30. Because the fourth microprocessor 33 is connected to the third microprocessor 30 by one and the same interface 20, it may be thought that it will be preferable to organize a direct link 53 by means of the bus 36 between the third and fourth microprocessors. In practice, a link of this kind is not possible because it is stipulated, especially under the standard, that the bus 36 will be under the control of the first microprocessor 3 and because, in particular, a link 54 between this first microprocessor 3 and a third microprocessor such as 30 is already provided under the standard. Thus in the invention, it is planned, by changing the address, that in a link 55 (physically using the same bus 36), the first microprocessor 3 will get connected with the fourth microprocessor 3 (instead of the third microprocessor 30). This change in address is planned by the transaction program 41 and designates, in practice, an interface 56 or 25 of the bus 36 comprising a connector to respectively receive the removable microcard 35 or the smart card 26.

By acting in this way, the fourth microprocessor 33 playing the role of a reader, then activates the first microprocessor 3 so that it makes the third microprocessor 30 read the identification number in the memory 32 of the smart card 26. In no case will there be a flow, on the bus 54, of signals other than those flowing outside a smart card, between itself and a conventional reader. Indeed, seen from the smart card 26, the pair formed by the first microprocessor 3 and the fourth microprocessor 33 is perceived as a standard reader and the security of the smart card 26 is not lessened.

If need be, certain actions can be launched conventionally by the second microprocessor 12 designed for the third microprocessor 30. It can than be planned in the invention that these commands, whatever they are, will in fact be conveyed by the first microprocessor 3 to the fourth microprocessor 33 so that the latter validates them, namely obtains their execution or non-execution depending on the degree of security that they imply. Thus, in the smart card, the third microprocessor 30 comprises a program memory 31 containing an application that can be activated by the first microprocessor 3. This application, in return, can even control the first microprocessor.

By acting in this way, the invention then becomes completely compatible with all the SIM circuits 13, whether or not they are provided with what is known as a TOOL KIT faculty, enabling the smart card to be interrogated. For the updating of the mobile telephone of the invention, it will be understood that it is enough to change the microcard 35. This microcard 35 is provided in its program memory 37 with all the necessary operations that the card 26 must be made to perform.

As an alternative manner to the tests 43 and 47, it may be planned to place state registers in the first microprocessor 3. These state registers will reflect a state of work or busy status of the second or fourth microprocessor. In this case, the program memory of the first microprocessor may be provided with a program to send a received or keyed-in command to the second or fourth microprocessor depending on the reading of a busy status of this second microprocessor or of this fourth microprocessor in these registers.

What is claimed is:
1. A mobile telephone comprising:
   a first microprocessor to carry out a physical management of telecommunications circuits of the mobile telephone,
   a second microprocessor to manage subscriber signals enabling the use of this mobile telephone on a mobile telephony network,
   a chip carrier reader to receive a chip carrier, this chip carrier is provided with a third microprocessor,
   wherein the mobile telephone comprises:
      a fourth microprocessor to manage the communication between the chip carrier reader and the first microprocessor, and
      in a program memory of the first or second microprocessor, a program for the rerouting, to the fourth microprocessor, of the commands whose execution by the second microprocessor has been attempted therein without success.
2. A telephone according to claim 1, comprising a program memory of the fourth microprocessor provided with a program to test whether a command received from the first microprocessor can be executed by this fourth microprocessor.
3. A telephone according to claim 1, comprising a program memory of the first microprocessor provided with a program to send a received or keyed-in command to the second or fourth microprocessor as a function of a busy status of this second or fourth microprocessor.
4. A telephone according to claim 1, comprising a removable chip carrier to contain the fourth microprocessor.
5. A telephone according to claim 1, wherein the fourth microprocessor comprises a data memory provided with a piece of identity information and/or information on the type of chip cater reader.
6. A telephone according to claim 1, comprising;
   a fifth circuit, comprising a fifth microprocessor, with an interface between a pack of the mobile telephone and a battery pack to manage an electric power supply of the mobile telephone.
7. A telephone according to claim 1, wherein the program to reroute commands to the fourth microprocessor comprises means to transmit these commands to the chip earner.
8. A telephone according to claim 1, comprising
   a third microprocessor in the chip carrier, this third microprocessor comprising a program memory containing an application activatable by the first microprocessor, this application being capable of controlling the first microprocessor.
9. A telephone according to claim 1, comprising means so that the first and fourth microprocessors dialog with each other according to the GSM standard 11 14.
10. A telephone according to claim 1 comprising, in a program memory, a program to store a command received from the network, verify the executable character of the received command and send the network an acknowledgment message if the execution of the command is possible.
11. A telephone according to claim 1 comprising, in program memory, a program to send the network a message providing information on a reader identifier and/or a version of this reader and/or an identifier of the third microprocessor.
12. A telephone according to claim 1, wherein the third microprocessor is contained in a microcard associated in a pair with the chip carrier.
13. A method for the control of a mobile telephone wherein,
   a first microprocessor is used to carry oat a physical management of the telecommunications circuits of the mobile telephone;

a second microprocessor is used to manage subscription signals enabling the use of this mobile telephone on a mobile telephony network, a chip carrier is received in a chip carrier reader, this chip carrier to be provided with a third microprocessor, the method comprising the following steps;

the communications between the chip carrier reader and the first microprocessor are managed by means of a fourth microprocessor, it is sought to obtain execution of a command by the second microprocessor, and commands whose execution by the second microprocessor has been attempted therein without success are rerouted towards the fourth microprocessor.

14. A method according to claim 13, wherein data whose execution by the fourth microprocessor has failed is stored in a memory of the telephone.

* * * * *